Feb. 2, 1954
H. NERNESS
2,667,731
TRACTOR ATTACHMENT FOR REFORMING WINDROWS
Filed Nov. 8, 1951
2 Sheets-Sheet 1
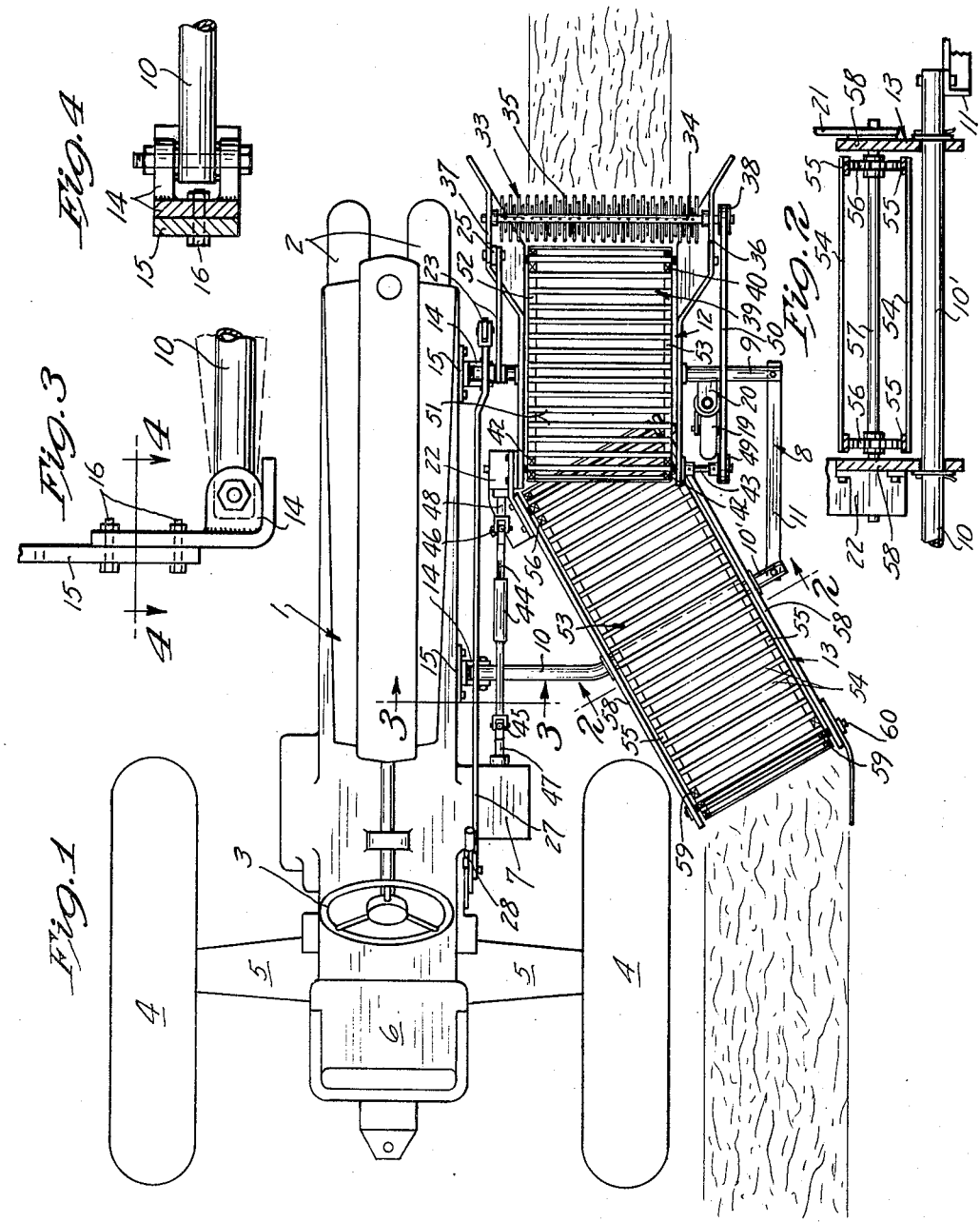
INVENTOR.
Harold Nerness
BY
Merchant & Merchant
ATTORNEYS

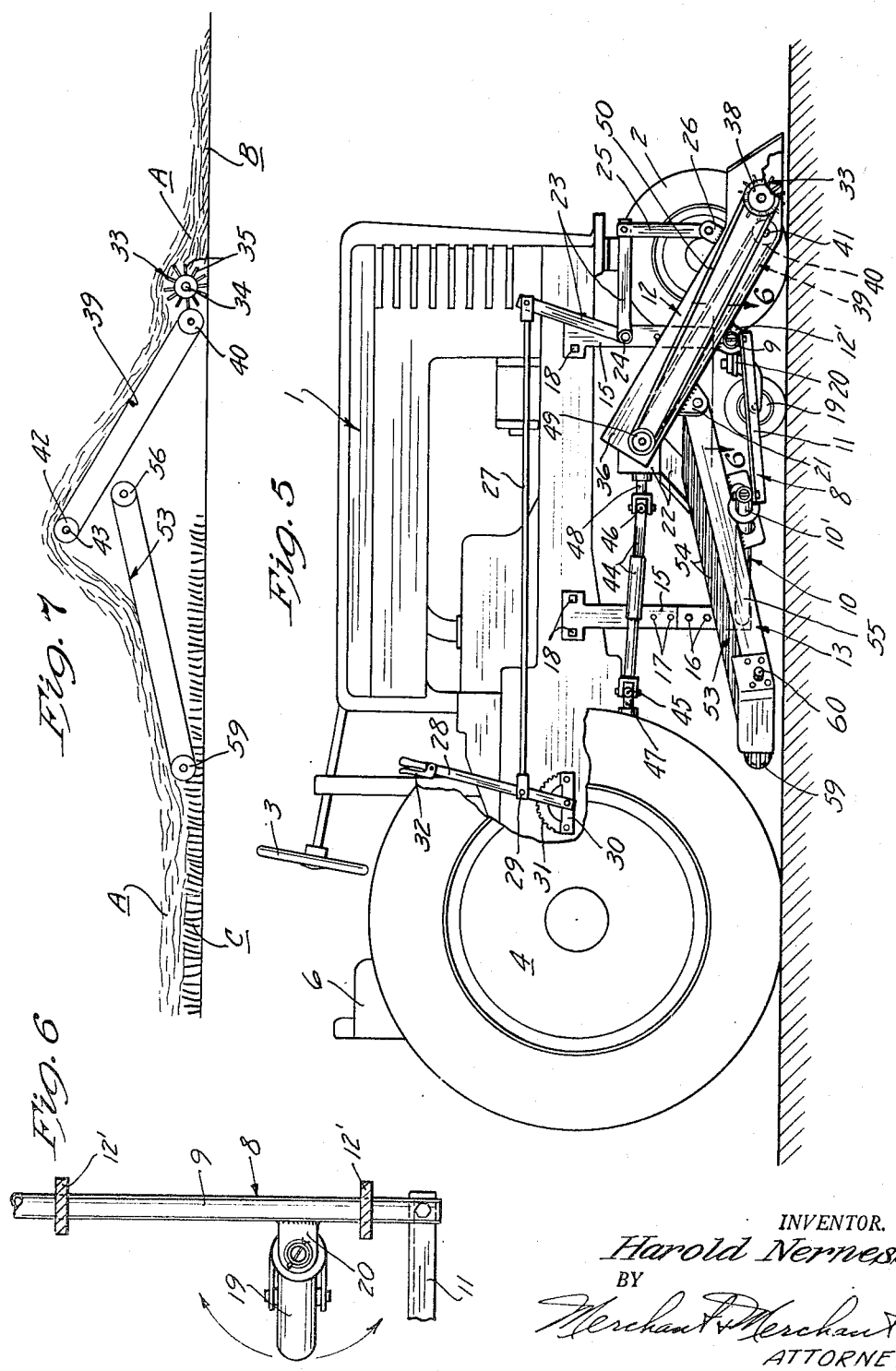

Patented Feb. 2, 1954

2,667,731

UNITED STATES PATENT OFFICE 2,667,731

TRACTOR ATTACHMENT FOR REFORMING WINDROWS

Harold Nerness, Windom, Minn.

Application November 8, 1951, Serial No. 255,454

3 Claims. (Cl. 56—377)

My invention relates generally to farm implements of the type adapted to be attached to a tractor and more specifically to apparatus for treating windrows of crops and the like.

More particularly, my invention is in the nature of a device for re-forming windrows in which the weight of the grain and other natural conditions such as rain have caused the windrowed crop to become packed down together with the underlying stubble on which the windrow was first laid. It is well known that when the windrowed crop settles or becomes packed down to the ground, proper curing thereof is prevented and damage to the crop results. For this reason, it sometimes becomes necessary to re-form the windrow to raise the same from the ground and permit air to circulate through the crop so that the same may be properly cured.

Several devices have heretofore been designed for agitating the windrowed crop and re-forming the windrow in addition to moving the windrow laterally and laying the same on stubble which has not become matted down. However, machines of the type which moved the windrow laterally have inverted the same causing undue agitation thereof whereby a substantial amount of the grain berries have been shaken loose from the stalks and lost. Other machines which have been designed to cause a minimum disturbance of the crop in re-laying the windrow caused the windrow to be re-laid in its original position upon matted down stubble and proper curing of the crop has not been satisfactorily achieved. The primary object of my invention, is, therefore, the provision of a windrow re-forming device which will pick up the matted down windrowed crop and re-lay the same in a new windrow laterally offset from the original one thereof upon upstanding stubble without undue disturbance of the crop thus preventing undue loss of grain berries and permitting the same to be subsequently properly cured.

Another object of my invention is the provision of a windrow re-forming device, as set forth, which may be readily attached to a farm tractor.

Another object of my invention is the provision of means whereby an improved windrow re-forming device will follow the contour of the ground over which the device travels.

Still another object of my invention is the provision of means for raising or lowering the device and for locking the same in desired set positions.

Still another object of my invention is the provision of a windrow re-forming device which is relatively simple and inexpensive to produce, which is efficient in operation, and which is rugged in construction and durable in use.

Other highly important objects and advantages of my invention will become apparent from the following detailed specification, appended claims, and attached drawings.

Referring to the drawings which illustrate the invention and in which like characters indicate like parts throughout the several views:

Fig. 1 is a top plan view of a windrow re-forming device built in accordance with my invention and shown as being coupled to a conventional farm tractor;

Fig. 2 is an enlarged fragmentary section taken substantially on the line 2—2 of Fig. 1;

Fig. 3 is an enlarged fragmentary detail as seen from the line 3—3 of Fig. 1, some parts being removed;

Fig. 4 is a horizontal section taken on the line 4—4 of Fig. 3;

Fig. 5 is a view in side elevation of the machine of Fig. 1, some parts being broken away;

Fig. 6 is an enlarged view partly in plan and partly in horizontal section, taken on the line 6—6 of Fig. 5; and Fig. 7 is a diagrammatic view illustrating the operation of my invention.

Referring with greater detail to the drawings, a tractor is indicated in its entirety by the numeral 1 and is shown as having dirigible front wheels 2 controlled by a steering wheel 3, laterally spaced tire-equipped driving wheels 4 mounted on driving axles, not shown but contained within an axle housing 5, an operator's seat 6, and a conventional power take off mechanism, not shown but contained within a power take off housing 7.

My improved windrow re-forming device includes a base frame structure 8 having front and rear base frame members 9 and 10 respectively connected at their outer ends by a brace member 11, a front conveyor frame element 12 and a rear conveyor frame element 13. At their inner ends, the frame members 9 and 10 are pivotally mounted to bearing brackets or the like 14 for swinging movements about aligned horizontal axes extending in the direction of travel of the tractor 1. The bearing brackets 14 are each rigidly but adjustably secured to the lower end portions of hanger bars or the like 15 by means of nut-equipped bolts or the like 16 extending through the brackets 14 and a desired pair of apertures 17 in the hanger bars 15. At their upper ends, the hanger bars 15 are adapted to be rigidly secured to the tractor 1, preferably by bolts or screws 18, see Figs. 1 and 5. The base frame 8 together with the parts carried thereby is supported at its outer end by a ground-engaging caster wheel 19 mounted in a bearing bracket 20 that is secured to the base frame member 9. The ground wheel 19 and the hinge connection between the base frame 8 and the hanger bars 15 permit the base frame 8 and parts carried thereby to closely follow the terrain over which the tractor and the windrow re-former travel in operation.

The conveyor frame element 12 inclines rearwardly and is provided with a pair of depending ears 12' that are journalled on the base frame member 9 to permit pivotal movements of the conveyor frame element 12, whereas, the rear conveyor frame element 13 inclines forwardly and is mounted for combined pivotal and longitudinal sliding movements on the base frame member 10. By reference to Fig. 1, it will be seen that the base frame member 10 is bent intermediate its ends so that the outer end portion 10' thereof extends angularly outwardly and forwardly. The conveyor frame element 13 being mounted on the angular portion 10', said frame element 13 is disposed at an oblique angle to the conveyor element 12. The front end of the conveyor frame 13 underlies the rear end portion of the front conveyor frame 12 and is pivotally secured to a bracket 21 welded or otherwise secured to one side of the conveyor frame element 12 and to a gear housing 22 connected to the opposite side of the frame element 12.

Means for raising and lowering the front end of the conveyor frame element 12 includes a bell crank 23 pivoted intermediate its ends to the forward one of the hanger arms 15, as indicated at 24, a link 25 pivotally secured at its opposite ends to one arm of the bell crank 23 and to an ear 26 welded or otherwise secured to the forward end portion of the conveyor frame element 12, a rigid connecting rod 27 and a lever-acting adjusting bar 28. The rod 27 is pivotally secured at one end to the other arm of said bell crank 23 and at its other end to the intermediate portion of the bar 28, as indicated at 29. The bar 28 at its lower end is pivotally secured to a notched quadrant 30 and has its other end conveniently located to the operator's seat 6. The bar 28 is provided with a conventional locking means, not shown, which may be assumed to engage the notched portion 31 of the quadrant 30, and is further provided with a release lever 32 so that the bar 28 may be moved in opposite directions to raise and lower the front end of the frame element 12. The pivotal connections between the front and rear conveyor frame elements cause the rear conveyor frame element 13 to rock simultaneously with the front element 12 when the control bar 28 is moved in one direction or the other, as will hereinafter be more fully described.

Journalled in the forward end of the front conveyor frame element 12 is a pickup head 33 which may be of any suitable form but, preferably and as shown, is in the nature of a rotary shaft 34 equipped with a plurality of radially outwardly projecting tines or pickup fingers 35. The shaft 5 is journalled in opposite side portions 36 and 37 of the frame element 12 and at its outer end is provided with a pulley 38 by means of which rotary movement is imparted to the head 33. An endless flexible link belt 39 runs over suitable pulleys or sprockets 40 on a shaft 41 extending transversely between and journalled in the side frame members 36 and 37 directly behind the pickup head 33 and a similar pair of sprockets 42 fast on a shaft 43 that is journalled in suitable bearings in the rear end of the frame element 12. The shaft 43 is driven from the power take off of the tractor 1 through a telescoping shaft 44 secured at its opposite ends by means of universal joints or the like 45 and 46 to the power take off shaft 47 of the tractor 1 and an input shaft 48 journalled in the gear housing 22 and operatively connected to the gearing, not shown but contained within said gear housing. A drive pulley 49 is secured to the outer projected end of the shaft 43 and drives an endless belt 50 which runs thereover and over the pulley 38. The conveyor belt 39 may be of any suitable construction but is preferably of the open-type comprising a plurality of spaced slats 51 secured at their opposite ends to link chains 52 which run over the sprocket wheels 40 and 42. By reference to Fig. 5, it will be seen that the flights of the conveyor belt 39, extending in a direction generally parallel to the frame element 12, are inclined toward the rear delivery end thereof.

A delivery conveyor 53 similar to the conveyor 39 comprises a plurality of spaced slats 54, the ends of which are secured to endless link chains 55 which run over sprocket wheels 56 mounted fast on a shaft 57 that is journalled in suitable bearings in opposite side frame members 58 of the conveyor frame 13. The shaft 57 extends into the gear housing 22 and may be assumed to be coupled to the shaft 43 by conventional driving connections, not shown, for rotation in the same direction as said shaft 43. The link chains 55 also travel over sprocket wheels 59 mounted on a shaft 60 which is journalled in suitable bearings in the rear end of the conveyor frame element 13. As shown, the flights of the delivery conveyor belt 53 extend generally in the direction of the rear conveyor frame 13, that is, inclining forwardly toward the upper rear delivery end of the first conveyor belt 39. As illustrated in Fig. 1, the rear delivery end of the conveyor belt 53 is laterally offset from the path of travel of the pickup head 33.

With particular reference to Figs. 1 and 7, it will be seen that the pickup head 33 rotates in a reverse direction with respect to the direction of travel of the tractor or counterclockwise with respect to Figs. 5 and 7. The conveyor belts 39 and 53 are also driven in a rearward direction to feed material rearwardly during forward movement of the machine through a field. Fig. 7 illustrates the action of the pickup head in passing underneath a windrow, indicated at A, and picking the same up from matted down stubble B. The grain is transferred to the upper delivery flight of the front conveyor 39 and is fed onto the rear conveyor 53 where it is carried at an angle with respect to the conveyor 39 and redeposited on upstanding stubble C in laterally offset relation to the matted down stubble B or, in other words, in laterally offset relation to the path of travel of the pickup head 33. Prior to engagement of the pickup head with the windrow A, the adjusting bar 28 is moved forwardly sufficient to lower the pickup head 33 to a position where it will engage the matted down windrow A and pick up the material thereof. After the windrow re-forming operation is completed, the lever is pulled rearwardly with respect to the tractor, thus raising the pickup end of the front conveyor and the rear delivery end of the rear conveyor so that said conveyors will avoid stones or other irregularities in the contour of the ground when the windrow re-forming device is moved from one field to another.

My improved windrow re-forming device, as above described, rapidly but gently re-forms the windrow upon upstanding stubble in spaced relation to the ground with a minimum loss of grain due to vibration or other disturbances and curing of the windrowed crop is readily accomplished by air being permitted to circulate below and through the material when it has been thus shifted.

While I have shown and described a preferred embodiment of my improved windrow re-forming device, it will be understood that the same is capable of modification without departure from the spirit and scope of the invention, as defined in the claims.

What I claim is:

1. In a windrow lifting and re-forming device, a frame structure comprising a base frame and a pair of elongated front and rear conveyor frame elements mounted intermediate their ends for swinging movements on generally horizontal axes on the base frame, adjustable means hingedly secured to the base frame for mounting the same to a tractor, a windrow pickup device including a pickup head journalled on the forward end of said front conveyor frame element in position to engage and pass underneath a windrow, a rearwardly inclined endless link belt conveyor mounted on said front conveyor frame element for receiving material from the pickup head and delivering said material rearwardly therefrom, an endless link belt delivery conveyor mounted on said rear conveyor frame element and inclined toward its front end, the front end of the delivery conveyor being positioned to receive material from the rear delivery end of the first-mentioned conveyor, said delivery conveyor being disposed at an oblique angle to the first-mentioned conveyor whereby the rear delivery end of the delivery conveyor overlies the ground in closely spaced relation to stubble thereon and in laterally offset relation to the path of travel of said pickup head, the relationship of said conveyors to each other and to said pickup head being such that the continuity of the windrow is undisturbed during the transfer thereof from its original position to the point of redeposit in laterally offset relationship thereto, manually operated mechanism for raising and lowering said pickup head and imparting swinging movement to said conveyor frames and locking the same in predetermined set positions, and power transmission mechanism for imparting operative movements to said pickup head and conveyors and including a drive shaft adapted to be coupled to the power take off of said tractor.

2. The structure defined in claim 1 in which the mechanism for imparting swinging movement to the conveyor frames includes a pivotal connection between the rear end of the front conveyor frame and the front end of said rear conveyor frame, whereby swinging movement of one thereof will impart swinging movement to the other thereof in the opposite direction.

3. In a windrow lifting and re-forming device, a frame structure comprising a base frame and a pair of elongated front and rear conveyor frame elements mounted intermediate their ends for swinging movements on generally horizontal axes on the base frame, adjustable means hingedly secured to the base frame for mounting the same to a tractor, a windrow pickup device including a pickup head journalled on the forward end of said front conveyor frame element in position to engage and pass underneath a windrow, a rearwardly inclined conveyor mounted on said front conveyor frame element for receiving material from the pickup head and delivering said material rearwardly therefrom, a conveyor mounted on said rear delivery conveyor frame element and inclined toward its front end, the front end of said delivery conveyor being positioned to receive material from the rear end of the first-mentioned conveyor, said delivery conveyor being disposed at an angle to the first-mentioned conveyor whereby the rear delivery end of the delivery conveyor overlies the ground in closely spaced relation to stubble thereon and in laterally offset relation to the path of travel of said pickup head, the relationship of said conveyors to each other and to said pickup head being such that the continuity of the windrow is undisturbed during the transfer thereof from its original position to the point of redeposit in laterally offset relationship thereto, mechanism for raising and lowering said pickup head and imparting swinging movement to said conveyor frames and retaining the same in predetermined set positions, and power transmission mechanism for imparting operative movements to said pickup head and conveyor.

HAROLD NERNESS.

References Cited in the file of this patent

UNITED STATES PATENTS

| Number | Name | Date |
| --- | --- | --- |
| 1,847,399 | Innes | Mar. 1, 1932 |
| 2,240,066 | Bingham | Apr. 29, 1941 |
| 2,267,303 | Jordan | Dec. 23, 1941 |
| 2,507,635 | James | May 16, 1950 |